(12) United States Patent
Rigney (10) Patent No.: US 7,633,706 B2
(45) Date of Patent: Dec. 15, 2009

(54) SERVOWRITER CONTACT TORQUE CONTROL

(75) Inventor: Brian Rigney, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 679 days.

(21) Appl. No.: 11/541,155

(22) Filed: Sep. 29, 2006

(65) Prior Publication Data

US 2007/0076318 A1    Apr. 5, 2007

Related U.S. Application Data

(60) Provisional application No. 60/722,864, filed on Sep. 30, 2005.

(51) Int. Cl.
*G11B 5/596* (2006.01)
*G11B 21/02* (2006.01)

(52) U.S. Cl. .................. 360/78.04; 360/75
(58) Field of Classification Search ............ None
See application file for complete search history.

(56) References Cited

U.S. PATENT DOCUMENTS

| | | | |
|---|---|---|---|
| 5,616,869 A | 4/1997 | Valent | |
| 5,668,679 A | 9/1997 | Swearingen et al. | |
| 5,774,294 A | 6/1998 | Fioravanti | |
| 5,835,302 A | 11/1998 | Funches et al. | |
| 6,147,831 A | 11/2000 | Kennedy et al. | |
| 6,151,185 A * | 11/2000 | Ishizuka et al. | 360/78.04 |
| 6,452,739 B1 | 9/2002 | Hino et al. | |
| 6,519,107 B1 | 2/2003 | Ehrlich et al. | |
| 6,603,627 B1 | 8/2003 | Chainer et al. | |
| 6,760,180 B2 | 7/2004 | Kino et al. | |
| 6,867,949 B1 | 3/2005 | Guo et al. | |
| 7,050,259 B1 | 5/2006 | Guo et al. | |
| 7,050,260 B1 | 5/2006 | Tung et al. | |
| 2002/0053251 A1 | 5/2002 | Bernard et al. | |

\* cited by examiner

*Primary Examiner*—Andrew L Sniezek
(74) *Attorney, Agent, or Firm*—Fellers, Snider, et al (57) ABSTRACT

Servo writer apparatus and associated method for writing servo information to a data storage device. The servo writer has an external positioner configured for contactingly positioning the actuator in relation to the storage medium. The servo writer furthermore has a contact torque control with executable instructions stored in memory that operably changes the actuator torque in relation to a change in the external positioner torque.

26 Claims, 6 Drawing Sheets

SERVOWRITER CONTACT TORQUE CONTROL

RELATED APPLICATIONS

The present application makes a claim of domestic priority to U.S. Provisional Patent Application No. 60/722,864 filed Sep. 30, 2005.

FIELD OF THE INVENTION

The claimed invention relates generally to the field of data storage and more particularly, but not by way of limitation, to an apparatus and method for writing servo information to a data storage medium.

BACKGROUND

Disc drives are data storage devices that store digital data in magnetic form on a rotating disc. Modern disc drives comprise one or more storage discs that are coated with a magnetizable medium and mounted on the hub of a spindle motor for rotation at a constant high speed. Information is stored on the discs in a plurality of circular tracks, typically by an array of transducers ("heads") mounted to a radial actuator for movement of the heads relative to the discs. During a write operation data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks, and therefore requiring enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo track writer ("STW") during the manufacture of the disc drive. The STW records servo patterns on the discs following assembly of the disc drive. The STW receivingly engages a disc drive that has a disc pack with mounted discs that have not been pre-recorded with servo patterns. The STW essentially uses the drive's own read/write heads to record the requisite servo patterns directly to the mounted discs.

These and other recent improvements in the art have significantly improved both, often competing, goals of enhanced quality and faster throughput. It is to the furthering of those efforts that the embodiments of the present invention are directed.

SUMMARY OF THE INVENTION

Embodiments of the present invention are generally directed to the writing of servo information to a moving media data storage device.

In some embodiments a servo writer apparatus is provided for writing servo information to a data storage device. The data storage device has an actuator in a data transfer relationship with a storage medium. The servo writer has an external positioner configured for contactingly positioning the actuator in relation to the storage medium. The servo writer furthermore has a contact torque control with executable instructions stored in memory that operably changes the actuator torque in relation to a change in the external positioner torque.

In some embodiments a method is provided including contactingly engaging an external positioner against an actuator of a data storage device to position the actuator at different locations in relation to a data storage medium of the data storage device; varying the external positioner torque during the contactingly engaging step; and varying the actuator torque in relation to changes in the external positioner torque to maintain a substantially constant contact torque.

In some embodiments a servo writer apparatus is provided with an external positioner that is contactingly engageable with a data storage device to move an actuator in a data transfer relationship with a storage medium, and means for biasing the actuator against the external positioner to maintain a substantially constant contact torque as variable torque is operably applied to the external positioner.

These and various other features and advantages which characterize the claimed invention will become apparent upon reading the following detailed description and upon reviewing the associated drawings.

DETAILED DESCRIPTION

Figure 1:
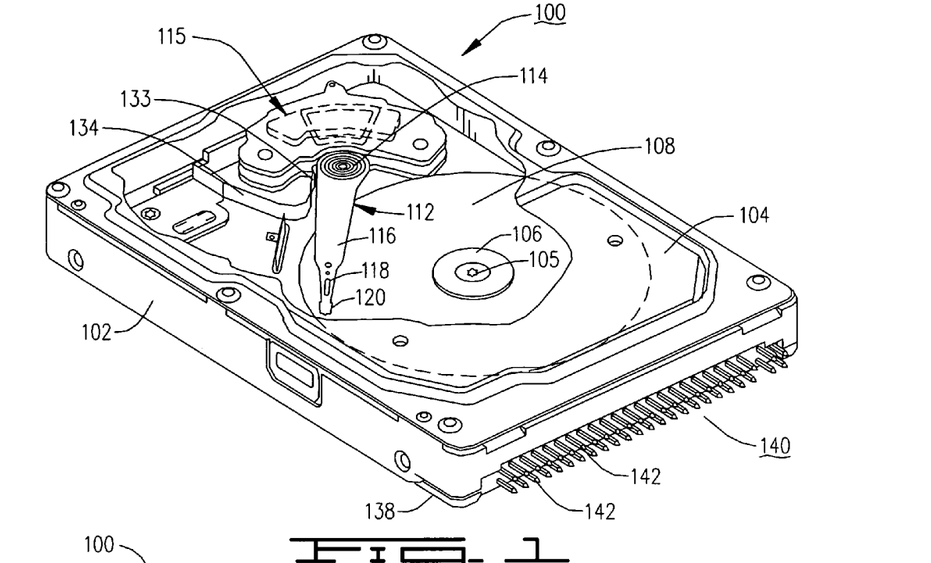
FIG. 1 is an isometric view of a data storage device with which embodiments of the present invention can be practiced.

Referring to the drawings in general, and more particularly to FIG. 1 that shows an isometric view of a data storage device 100 (or "drive") constructed in accordance with embodiments of the present invention. The drive 100 preferably includes a base 102 and a cover 104 (partially cutaway), which together provide a housing for a number of components. The components include a motor 105 to which a clamp 106 is attached for fixing one or more storage mediums 108 (or "discs") in rotation therewith. Adjacent the disc 108 is an actuator 112 that is pivotable around a bearing assembly 114 by selectively energizing a voice coil motor ("VCM") 115. The actuator 112 includes an arm 116 supporting a load arm 118 that, in turn, supports a head 120 (or "transducer") at a distal end thereof in a data transfer relationship with the disc 108. Each disc 108 can be divided into data tracks, and the head 120 is positioned to retrieve data from and store data to the tracks.

To provide the requisite electrical conduction paths between the head 120 and drive 100 control circuitry, the head 120 advantageously has a flex circuit (shown below) that is routed on the actuator 112 from the head 120, along the load arm assembly 118 and the arm 116, and to a circuit portion 133 that is supported by a proximal end (sometimes referred to as "E block") of the actuator 112 by steps for soldering the circuits together in electrical connection. The circuit portion 133 connects the head 120 flex circuit to another flex circuit 134 which passes through the base 102 to a printed circuit board (PCB) 138. An electrical connector 140 attached to the PCB 138 has a plurality of contacts 142 for connecting the drive 100 to a mating connector (not shown), such as for placing the drive 100 in communication with external control circuitry.

Figure 2:
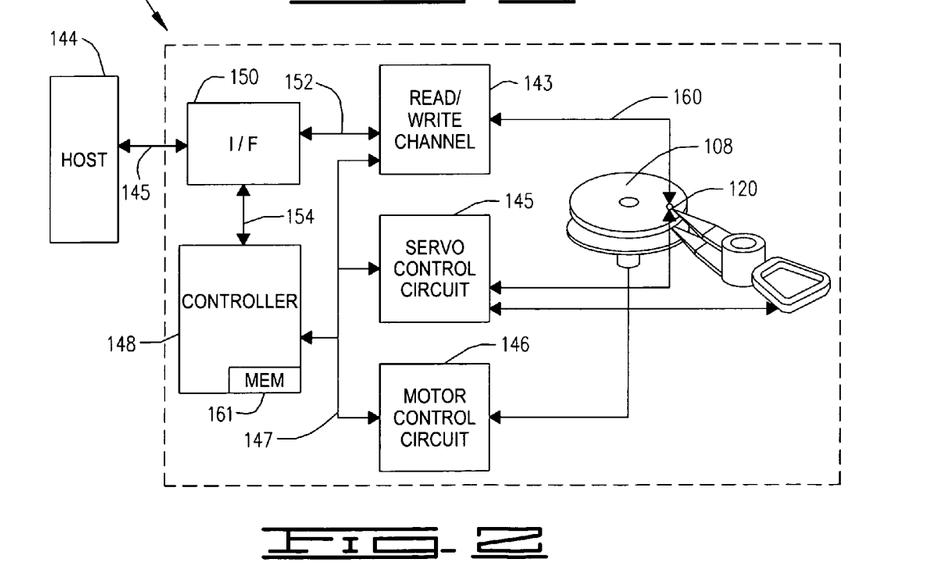
FIG. 2 is a control block diagram of the data storage device of FIG. 1.

FIG. 2 is a functional block diagram illustrating types of control signals and data transfers that can be passed between the drive 100 and a remote device, such as with a host 144 via a bus 145. The drive 100 generally has a read/write channel 143, a servo control circuit 145, and a motor control circuit 146, all connected by a control bus 147 to a controller 148. An interface circuit 150 is connected to the read/write channel 143 by bus 152 and to the controller 148 by bus 154. The interface circuit 150 serves as a communications interface between the drive 100 and the host device (or other remote device as described below). Generally, in response to an access command from the host 144, and received by the controller 148 from the interface 150, the controller 148 controls the flow of data to and from the disc 108. The read/write channel 143, in turn, provides store and retrieve signals to the head 120 in order to store data to the disc 108 and retrieve data from the disc 108. The head 120 can, for example, provide an analog read signal to the read/write channel 143, which in turn converts the analog read signal to digital form and performs the necessary decoding operations to provide data to the interface circuit 150 for output to the host 144. A buffer 161 exists under the control of the controller 148 in order to temporarily store data associated with host 144 access commands with the disc 108.

Figure 3:
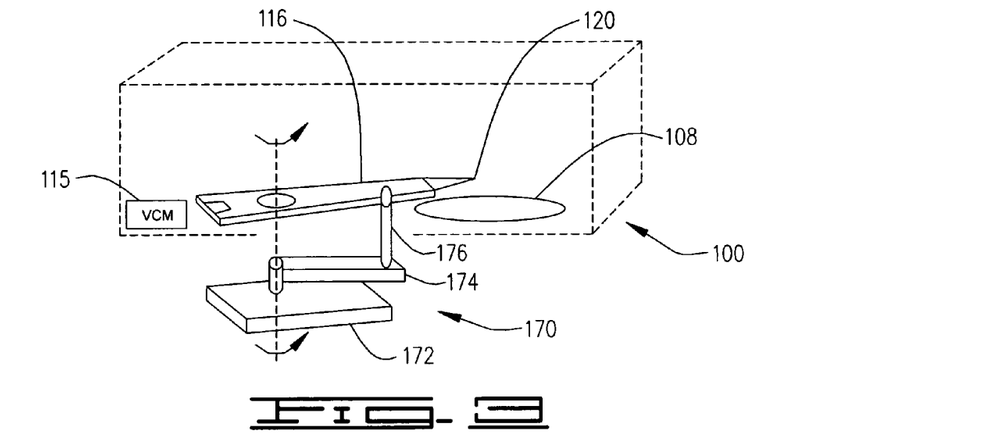
FIG. 3 is a diagrammatic depiction of a servo track writer (STW) receivingly engaging a data storage device in accordance with embodiments of the present invention.

FIG. 3 is a diagrammatic depiction of a servo track writer ("STW") 170 that is used in accordance with the present embodiments to write servo information to the discs 108. The STW 170 generally has a positioning system 172 for precisely rotating an external positioner 174 that can include a push-pin 176. The push-pin 176 is insertable through an opening in the base 102 of the drive 100, for making contacting engagement with the actuator arm 116. In equivalent alternative embodiments the external positioner 174 can provide a noncontacting engagement with the actuator 112, such as by providing a light source in combination with an optical diffraction grating on the actuator 112. Although not particularly shown, the positioning system 172 also includes a position control element, such as an encoder or other interferometer element, and a fixed data transfer element for writing a clock track to the disc 108.

The STW 170 is a manufacturing article that receivingly engages a drive 100 for the purpose of writing some or all of the servo tracks to the discs 108. Once the servo track writing procedure is completed, the drive 100 entirely embodies the article of manufacture; the STW 170 forms no part thereof. Hence, for purposes of this description and meaning of the appended claims, the term "external" such as "external positioning device" with respect to the drive 100 means an item that is not part of the drive 100.

Preferably, the STW 170 is configured so as to be readily connectable to a drive 100 via a connector mating with the connector 140 (FIG. 1). In this manner the STW 170 has entire access to the on-board control circuitry described in FIG. 2, in much the same manner as the host 144 does.

Figure 4:
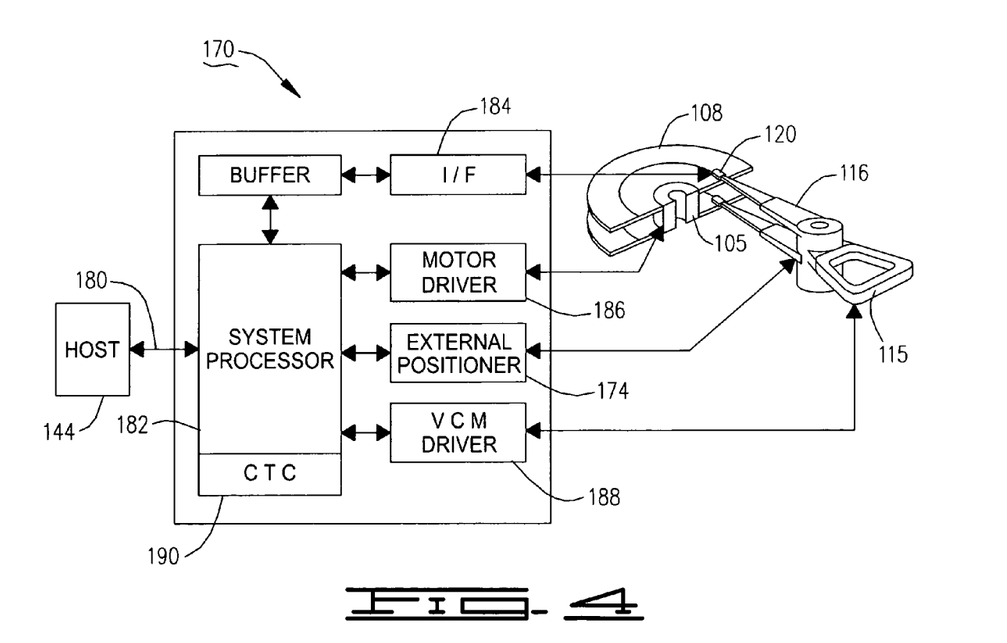
FIG. 4 is a control block diagram of the STW of FIG. 3.

FIG. 4 is a diagrammatic depiction of the host 144, now employed to write servo tracks, in communication with the STW 170 via a bus 180. Key components of the STW 170 include a system microprocessor 182 providing top-level control of all the servo track writing activities, as they are directed by the host 144. An interface 184, motor driver 186, and VCM driver 188 communicate with the interface 150, motor control circuit 146, and servo control circuit 145, respectively, of the data storage device illustrated in FIG. 2. Also shown is the external positioner 174 that contactingly positions the actuator 112 in relation to the discs 108.

A contact torque control ("CTC") 190 is illustrated in the form of programming instructions stored in memory that are executable by the processor 182 for adaptively compensating the actuator 112 torque in relation to observed changes in the external positioner 174 torque.

The STW 170 supplies power to the spindle motor 105 for rotating the discs 108 in a data transfer relationship with the heads 120. The external positioner 174 moves the heads 120, via the contacting engagement of the push-pin 176 with the arm 116 in these illustrative embodiments, across the discs 108 to write servo information.

Figure 5:
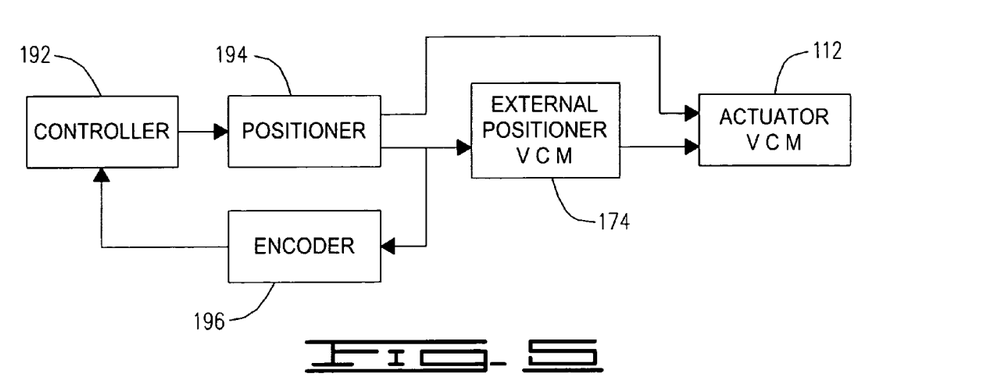
FIG. 5 is a functional block diagram of elements of the contact torque control of the present embodiments.

FIG. 5 is a simplified functional block diagram illustrating how system processor 182 resources execute and control the CTC 190 to provide a controller function 192. The VCM driver 188 and external positioner 174 cooperatively provide a power-distributing positioner function 194. In this manner the controller 192 and positioner 194 generally govern the controlled actuation of both the drive VCM and the external positioner VCM. An encoder 196 or other interferometer element provides positional feedback of the external positioner 174 to the controller 192.

The contacting engagement of the external positioner 174 against the actuator 112 can result in unacceptable resonance stemming from mechanical vibrations. This condition is aggravated by a metal to metal contacting engagement, so it can be advantageous to provide a resilient surface on one or both of the push-pin 176 and the arm 116. A "resilient" surface, for purposes of this description and meaning of the appended claims, generally means a damping surface for attenuating the resonances. An elastomeric member or covering, or a deflection feature, for example, has proven to be an advantageous improvement over a metal to metal contacting engagement for reducing these contact resonances.

Figure 6:
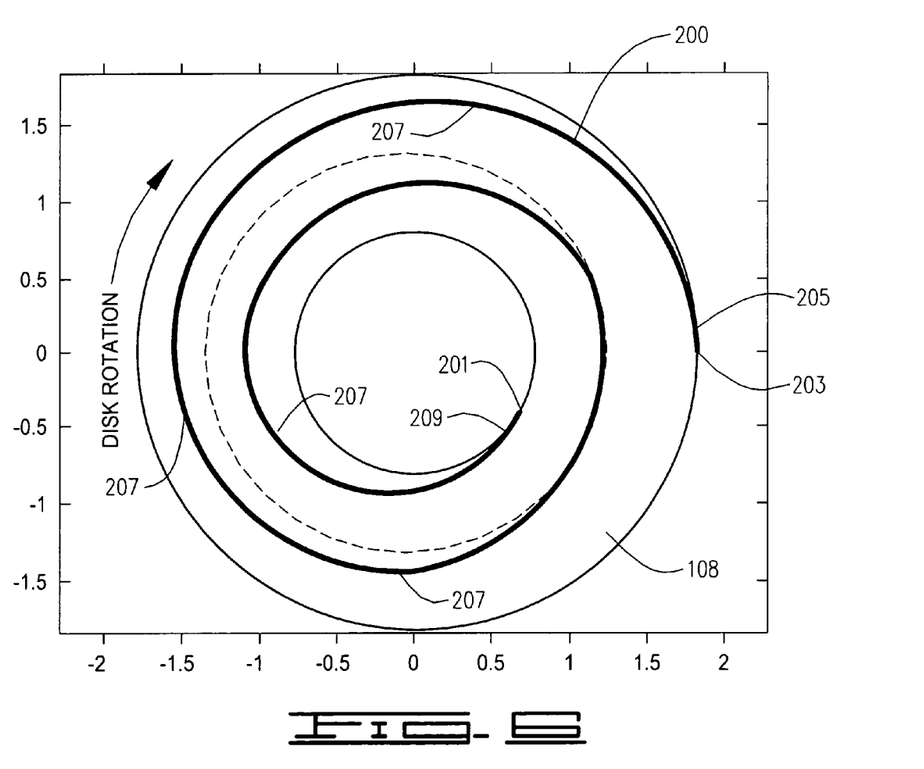
FIG. 6 is a diagrammatic depiction of a spiral servo track as is produced by practicing embodiments of the present invention.

However, the practical realities of servo track writing can make the use of a resilient contacting engagement surface problematic. FIG. 6, for example, illustrates a spiral servo track 200 spanning from the innermost track 201 to the outermost track 203 in just two revolutions of the disc 108. In order to write the spiral track 200, the external positioner 174 imparts a very significant acceleration at the start of the spiral (denoted at 205) to reach the desired track-writing radial velocity (denoted at 207) as quickly as possible. Furthermore, a significant deceleration of the external positioner 174 occurs at the end of the spiral (denoted at 209) in order to continue the desired track-writing radial velocity as long as possible. The changes in torques associated with these accelerations and decelerations can cause compression or deflection of the resilient surface(s), thereby adversely changing the spatial separation between the external positioner 174 and the head 120, even while maintaining a contacting engagement nonetheless.

Figure 7:
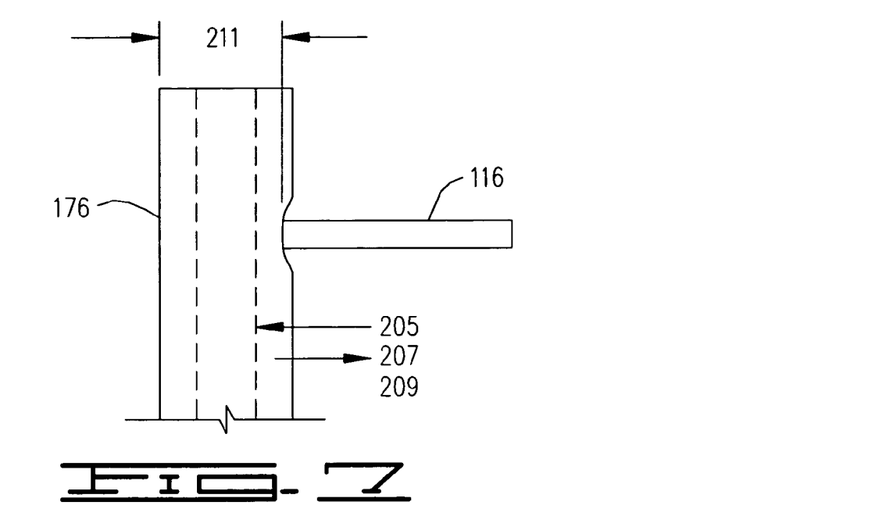
FIG. 7 is an enlarged detail view of the external positioner contactingly positioning the actuator.

The present embodiments resolve this problem by varying the drive VCM torque in relation to changes in the external positioner torque. This maintains a substantially constant resulting contact torque, and thereby a substantially constant compression of the resilient surface during the contacting engagement. For example, FIG. 7 is an enlarged view of the push-pin 176 contactingly positioning the actuator 112 by a pressing engagement against the arm 116. It will be noted that the push-pin 176 has a resilient covering material. A predetermined amount of compression, denoted by 211, remains substantially constant for all movements of the push-pin 176 in either direction (denoted by the two arrows) and at the track-writing velocity 207 as well as during the accelerations and decelerations 205, 209, respectively.

Theoretical solutions are possible with knowledge of the torque constant of the external positioner 174, $k_{\tau E}$, and of the torque constant of the actuator 112, $k_{\tau A}$, in order to derive the torque ratio $k_\tau = k_{\tau E}/k_{\tau A}$. However, it has been determined during reduction to practice of the present embodiments that the part-to-part variation in these torque constant values can vary significantly. The conclusion resulting from discovery of the present embodiments is that empirically determining the torque ratio $k_\tau$ offers a far more robust solution.

Figure 8:
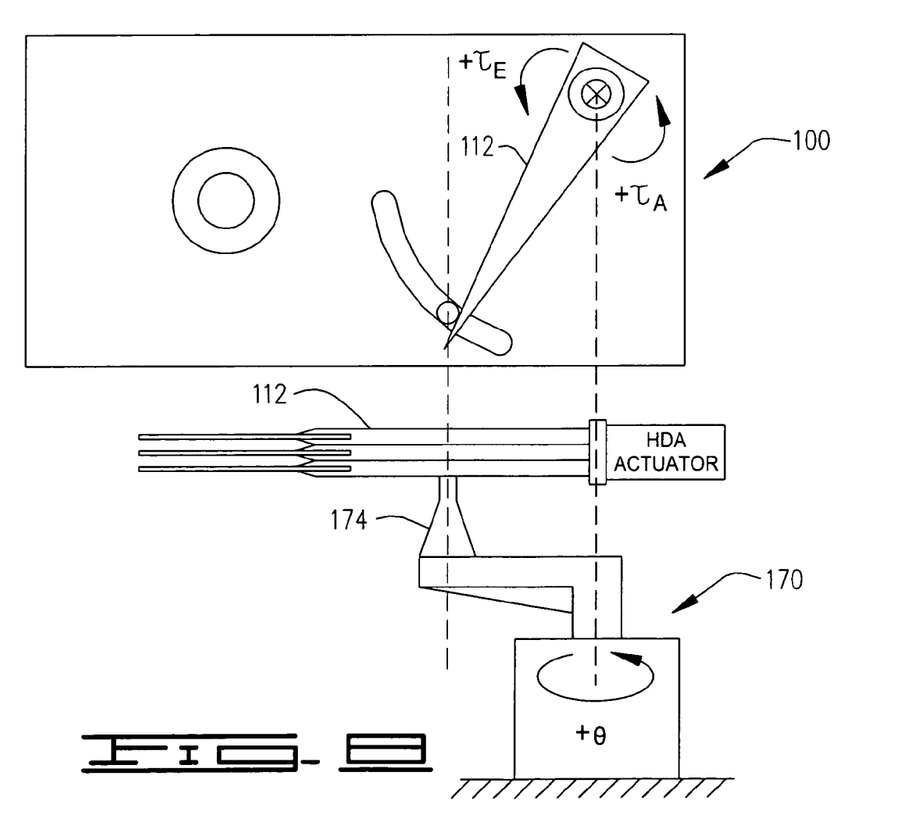
FIG. 8 is a free body diagram of the STW and the data storage device during servo writing.

FIG. 8 is a free body diagram of the STW 170 in contacting engagement with the actuator 112 in the drive 100. For purposes of this description, a positive angular displacement θ is defined as being from an inner diameter portion of the disc 108 to an outer portion thereof. The equation of motion for the external positioner 174 is:

$$J_E \dot{\omega}_E = \tau_E + \tau_{Contact}$$

where $J_E$ is the moment of inertia of the external positioner 174, $\omega_E$ is the angular acceleration of the external positioner 174, and $\tau_{Contact}$ is the contact torque resulting from the contacting engagement between the external positioner 174 and the actuator 112. The equation of motion for the actuator 112 alone is:

$$J_A \dot{\omega}_A = \tau_A - \tau_{Contact}$$

where $J_A$ is the moment of inertia of the actuator 112 and $\omega_A$ is the angular acceleration of the actuator 112. The sign on $\tau_{Contact}$ is negative because it is equal and opposite to the torque as seen by the external positioner 174. Combining these two equations and making the assumption that $\omega_E$ and $\omega_A$ are equal provides:

$$\tau_A = \frac{J_A}{J_E}\tau_E + \frac{J_A + J_E}{J_E}\tau_{Contact}$$

Assuming the positioner 194 (FIG. 5) is a current-mode power module (as opposed to a voltage-mode), and given that $\tau = k_\tau i$, then this equation can be rewritten as:

$$i_A = \frac{J_A}{J_E}\frac{k_{tE}}{k_{tA}}i_E + C_1$$

where $i_A$ is the drive VCM current, $i_E$ is the STW VCM current, $k_{tE}/k_{tA}$ is the torque constant ratio, and the constant $C_1$ is a scaled version of the desired contact torque. At steady state conditions ($\omega_E$ and $\omega_A$ are zero) the first two equations simplify to:

$$\tau_E + \tau_A = 0$$

The torque from the drive VCM is equal and opposite to the torque from the STW VCM, and the system does not accelerate. Converting this equation into current gives:

$$k_{tA}(i_A - i_{oA}) = k_{tE}(i_E - i_{oE})$$

where $i_{oD}$ and $i_{oE}$ are offsets due to biases in the circuitry. By reordering this equation, the dependence on the $k_t$ ratio is:

$$i_A = \frac{k_{tE}}{k_{tA}}i_E + C_2$$

where $C_2$ is a constant due to a combination of analog biases. This relationship makes it possible to determine the torque ratio by observing steady state currents supplied to the drive VCM and the STW VCM.

Figure 9:
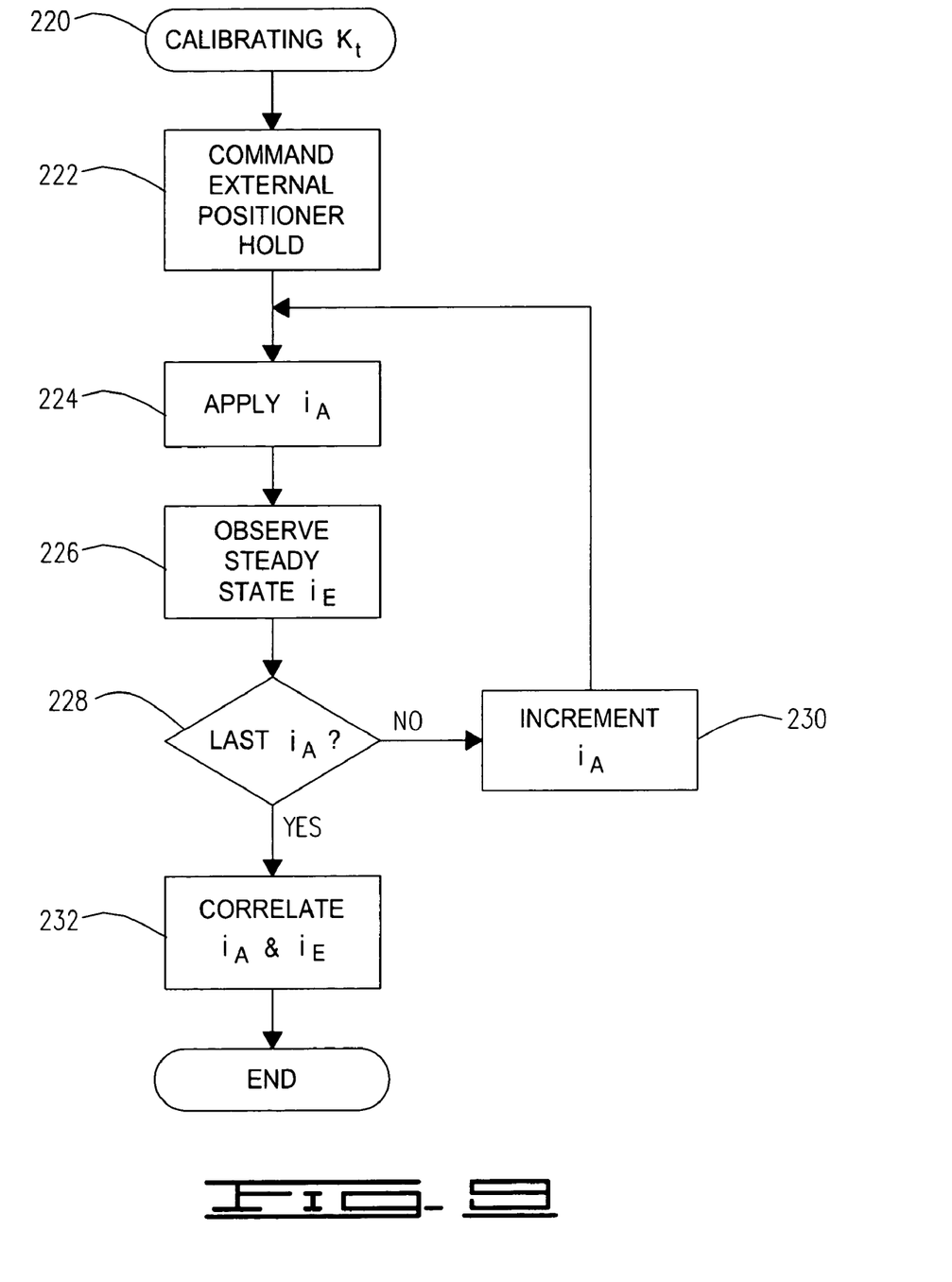
FIG. 9 is a flowchart illustrating steps in a method for CALIBRATING $t_k$ in accordance with embodiments of the present invention.

FIG. 9 is a flowchart of steps of a method 220 for CALIBRATING $k_t$ that is performed by the CTC 190 (FIG. 4) of the present embodiments.

The method 220 begins in block 222 with the controller 192 (FIG. 5) commanding the external positioner 174 to hold a constant angular position, thereby keeping the system at steady state. In block 224 a first selected current is applied to the drive VCM. In block 226 a dwell occurs until the system returns to steady state, at which time the value of the STW current required to achieve the steady state condition is observed.

It is determined in block 228 whether more data sets are desired. In some embodiments a predetermined number of data sets are obtained. Alternatively, the number of data sets can be empirically determined by a calculated error from curve fitting the data. If the determination of block 228 is no, then the drive VCM current is incremented in block 230 and control returns to block 224. Otherwise, the data sets are correlated in block 232 to determine a value for $k_t$.

Figure 10:
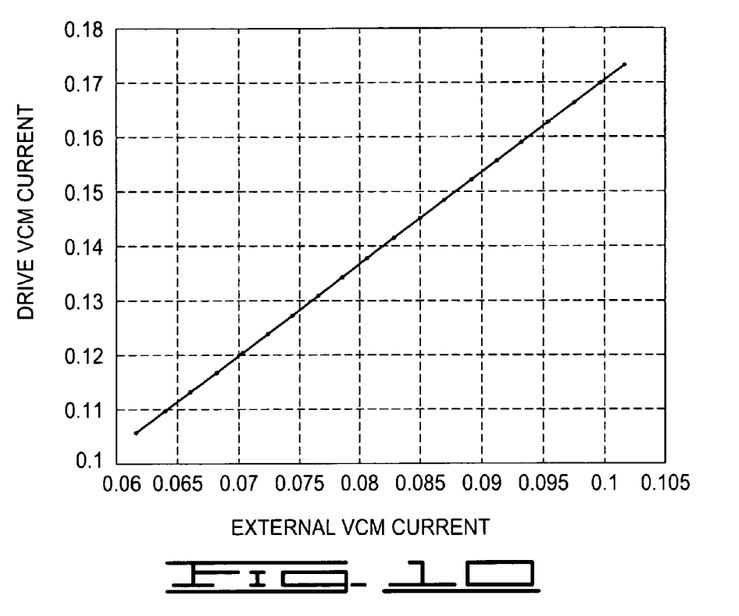
FIG. 10 graphically depicts correlated test data.

FIG. 10 graphically illustrates the correlation of test data that was obtained during reduction to practice of the present embodiments. The drive VCM current was varied between 110 mA and 180 mA, causing changes in the STW VCM current between 60 mA and 100 mA. A linear least squares fit resulted in the following correlation, yielding a $k_t$ value of 1.1713:

$$i_A = 1.1713 i_E + 0.0002$$

With this correlation stored in memory, such as in a map or table, the CTC 190 operably maintains a substantially constant torque ratio of external positioner 174 torque to actuator 112 torque, for all values of torque applied to the external positioner 174. Particularly, the controller 192 can adaptively compensate the current supplied to the drive VCM in relation to an observed change in the current supplied to the external positioner 174. The adaptive compensation is governed by the predefined correlation obtained from the empirical analysis of the calibration routine 220 of FIG. 9, yielding the correlation between the external positioner 174 motor current and the actuator 112 motor current.

This predefined correlation relates a required steady state external positioner 174 motor current, respectively, to each of a plurality of different actuator 112 motor currents. To achieve the steady state condition, the controller 192 commands the external positioner 174 to hold a constant position while determining the predefined correlation.

It has also been observed during reduction to practice of the present embodiments that the contact torque can vary because the torque constants tend to change at different radial locations of the disc 108. It appears this could likely be the result of the actuator 112 being rotated to extreme inner or outer regions of the disc 108, such that the drive VCM coil begins to be immersed in fringe flux fields of the opposing magnets, thereby relatively weakening the magnetic flux field. For this reason it can be advantageous for the CTC 190 to command the external positioner 174 to hold a steady state condition at two or more different positions while determining the predefined correlation. In this manner, the disc 108 can be divided into zones, with the CTC 190 defining a first predefined correlation in relation to a first zone, and defining a second predefined correlation in relation to a second zone.

Figure 11:
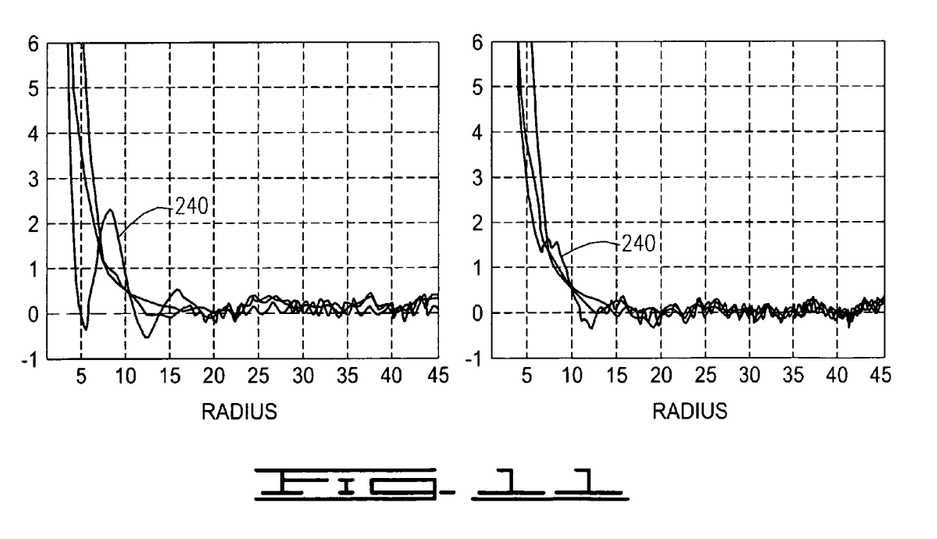
FIG. 11 graphically depicts the effectiveness of the present embodiments in damping acceleration-induced head oscillations.

The inventors have proven that practicing the present embodiments improves the quality of servo tracks. For example, FIG. 11 graphically illustrates the amount of track misregistration (TPI error [%]) observed during significant acceleration of the external positioner 174 radially across the disc 108 (x-axis). The left-hand graph was obtained using a $k_t$ value that was set at about 15% error, without practicing the present embodiments described herein. It will be noted that the head position curve 240 shows the presence of acceleration-induced oscillations. These oscillations will result in track squeeze in the servo tracks being written in this condition. The right-hand graph was obtained by practicing the present embodiments with the same 15% $k_t$ error. However, the adaptive compensation of the present embodiments is clearly evident by the damping of the acceleration-induced oscillations in the head position curve 240. These damping effects have demonstrated the capability of producing higher quality spiral tracks, where the external positioner 174 is subjected to significant acceleration and deceleration at the ends of each spiral track.

Generally, the embodiments of the present invention contemplate a servo writer apparatus having an external positioner that is contactingly engageable with a data storage device to move an actuator in a data transfer relationship with a storage medium, and means for biasing the actuator against the external positioner to maintain a substantially constant contact torque as variable torque is operably applied to the external positioner. For purposes of this description and meaning of the appended claims, the term "means for biasing" contemplates the disclosed structure that changes the actuator 112 torque in relation to changes in the external positioner 174 torque. Accordingly, the term "means for biasing" expressly does not include previous attempted solutions that bias the actuator against the external positioner with a constant torque, or with a varying torque but not varying in relation to changes in the external positioner torque.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a servo track writer for writing spiral servo tracks to a data storage device, it will be appreciated by those skilled in the art that the claimed subject matter is not so limited and various other processing systems can be utilized without departing from the spirit and scope of the claimed invention.

What is claimed is:

1. A servo writer apparatus for writing servo information to a data storage device having an actuator in a data transfer relationship with a storage medium, the servo writer comprising:
   an external positioner configured for contactingly positioning the actuator in relation to the storage medium; and
   a contact torque control with executable instructions stored in memory that operably changes the actuator torque in relation to a change in the external positioner torque.

2. The servo writer of claim 1 wherein the contact torque control operably maintains a substantially constant ratio of external positioner torque to actuator torque.

3. The servo writer of claim 2 wherein the contact torque control operably changes a current supplied to a motor driving the actuator in relation to a change in a current supplied to a motor driving the external positioner.

4. The servo writer of claim 3 wherein the contact torque control operably changes the actuator motor current in relation to a predefined correlation between the external positioner motor current and the actuator motor current.

5. The servo writer of claim 4 wherein the contact torque control operably determines the predefined correlation by relating a required steady state external positioner motor current, respectively, to each of a plurality of different actuator motor currents.

6. The servo writer of claim 5 wherein the contact torque control operably commands the external positioner to hold a constant position while determining the predefined correlation.

7. The servo writer of claim 6 wherein the contact torque control operably commands the external positioner to hold two or more different positions while determining the predefined correlation.

8. The servo writer of claim 7 wherein the contact torque control operably defines a first predefined correlation in relation to a first zone of the data storage medium and defines a second predefined correlation in relation to a second zone of the data storage medium.

9. The servo writer of claim 2 wherein at least one of the external positioner and the actuator comprises a resilient contacting engagement surface.

10. The servo writer of claim 9 capable of positioning the actuator at a reference position and writing servo information to the data storage medium.

11. The servo writer of claim 10 capable of writing the servo information in a spiral track while moving away from the reference position.

12. A method comprising:
   contactingly engaging an external positioner against an actuator of a data storage device to position the actuator at different locations in relation to a data storage medium of the data storage device;

varying the external positioner torque during the contactingly engaging step; and varying the actuator torque in relation to changes in the external positioner torque to maintain a substantially constant contact torque.

13. The method of claim 12 wherein the varying the actuator torque step comprises maintaining a predetermined ratio of external positioner torque to actuator torque.

14. The method of claim 13 wherein the maintaining step comprises correlating a current supplied to a motor driving the external positioner to a current supplied to a motor driving the actuator.

15. The method of claim 14 wherein the correlating step comprises commanding the external positioner to hold a constant position.

16. The method of claim 15 wherein the correlating step comprises applying a first selected current to the actuator motor and observing a steady state current required by the external positioner motor.

17. The method of claim 16 wherein the correlating step comprises applying two or more different selected currents to the actuator motor and observing the steady state currents, respectively, required by the external positioner motor.

18. The method of claim 16 wherein the correlating step comprises modeling the relationship between the actuator current levels and the respective external positioner steady state current levels.

19. The method of claim 18 wherein the correlating step comprises modeling the relationship between the actuator current levels and the respective external positioner steady state current levels at two or more different positions of the external positioner.

20. The method of claim 19 wherein the correlating step comprises modeling a first relationship between the actuator current levels and the respective external positioner steady state levels in relation to a first zone of the storage medium, and modeling a second relationship between the actuator current levels and the respective external positioner steady state levels in relation to a second zone of the storage medium.

21. The method of claim 19 wherein the correlating step is characterized by one of an empirically determined sample size and a predetermined sample size.

22. The method of claim 13 further comprising positioning the actuator at a reference location and writing servo information to the data storage medium at the reference location.

23. The method of claim 22 further comprising moving the actuator away from the reference location while writing servo information to the data storage medium.

24. The method of claim 23 wherein the varying the actuator torque step is responsive to acceleration of the external positioner.

25. The method of claim 23 wherein the servo information is written in a spiral pattern.

26. A servowriter apparatus comprising:

an external positioner that is contactingly engageable with a data storage device to move an actuator in a data transfer relationship with a storage medium; and means for biasing the actuator against the external positioner to maintain a substantially constant contact torque as variable torque is operably applied to the external positioner.

* * * * *

UNITED STATES PATENT AND TRADEMARK OFFICE
CERTIFICATE OF CORRECTION

| | |
|---|---|
| PATENT NO. | : 7,633,706 B2 |
| APPLICATION NO. | : 11/541155 |
| DATED | : December 15, 2009 |
| INVENTOR(S) | : Brian Rigney |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this

Ninth Day of November, 2010

David J. Kappos
*Director of the United States Patent and Trademark Office*